United States Patent [19]
Gabriel

[11] Patent Number: 5,868,357
[45] Date of Patent: Feb. 9, 1999

[54] AUTOMATICALLY-ACTUATED CARGO AND PERSONNEL SCOOPING APPARATUS WITH STRAIN GAUGES, FINGERS AND SENSORS

[76] Inventor: Edwin Zenith Gabriel, 91 Mt. Tabor Way, Ocean Grove, N.J. 07756

[21] Appl. No.: 406,738

[22] Filed: Mar. 20, 1995

[51] Int. Cl.[6] .............................. B64D 1/08; B64D 9/00; B25B 1/24; B66C 1/00
[52] U.S. Cl. .................................. 244/137.1; 244/137.2; 294/118; 294/907
[58] Field of Search ............................. 244/118.1, 137.1, 244/137.2; 294/118, 907

[56] References Cited

U.S. PATENT DOCUMENTS

| | | | |
|---|---|---|---|
| 3,952,880 | 4/1976 | Hill et al. ................................. | 294/907 |
| 3,972,427 | 8/1976 | Stanley et al. . | |
| 4,579,380 | 4/1986 | Zaremsky et al. ...................... | 294/907 |
| 4,600,357 | 7/1986 | Coules .................................... | 294/907 |
| 4,605,354 | 8/1986 | Daly ........................................ | 294/907 |
| 4,788,211 | 11/1988 | Gabriel .................................... | 294/118 |
| 4,848,703 | 7/1989 | Coulson et al. ...................... | 244/137.1 |
| 4,943,099 | 7/1990 | Gabriel .................................... | 294/118 |
| 5,209,435 | 5/1993 | Edwards ............................... | 244/137.2 |
| 5,209,538 | 5/1993 | Gabriel .................................... | 294/118 |
| 5,593,113 | 1/1997 | Cox ...................................... | 244/137.1 |
| 5,713,538 | 2/1998 | Gabriel ................................. | 244/118.1 |

Primary Examiner—Virna Lissi Mojica

[57] ABSTRACT

This is a [relatively] simple load lifting apparatus, tongs-like in appearance, with a larger lower portion for grabbing loads of various sizes. It has two embracing halves, pivoted at a selected distance from the apparatus' top. [Its lower portions tend to be vertical to enable it to hold a containerized load in place, as in previous Gabriel's U.S. Pat. No. 5,209,538.] It is designed to safely and reliably hold a person between its lower portions without injuring one who may be wounded [on the battlefield or in the ocean]. Sensors are added to enable it to sense the distance of the apparatus' lower portions from the load. When in range of the load, its lower portions automatically separate to straddle the load [without making contact with it]. When the flexible fingers, extending inward from the bottom of each lower portion, touch a platform surface or terrain, then a motorized gearing may cause the lower portions to come together. In so doing, the fingers slide underneath the person or a light [containerized] load until the hammerheads above the pivot pin make contact. Then the load is safely inside the two lower portions and ready to be hoisted up[ward]. Strain gages at selected locations on the fingers produce signals, indicating that the fingers have made contact with the surface below. Another technique for causing upper and lower portions to separate from each other is to use electromagnets at apparatus' upper portions, polarized to repel, when needed. Bipolar magnets at hammerheads also can cause their repulsion or attraction, to either separate or engage apparatus' lower portions.

14 Claims, 12 Drawing Sheets

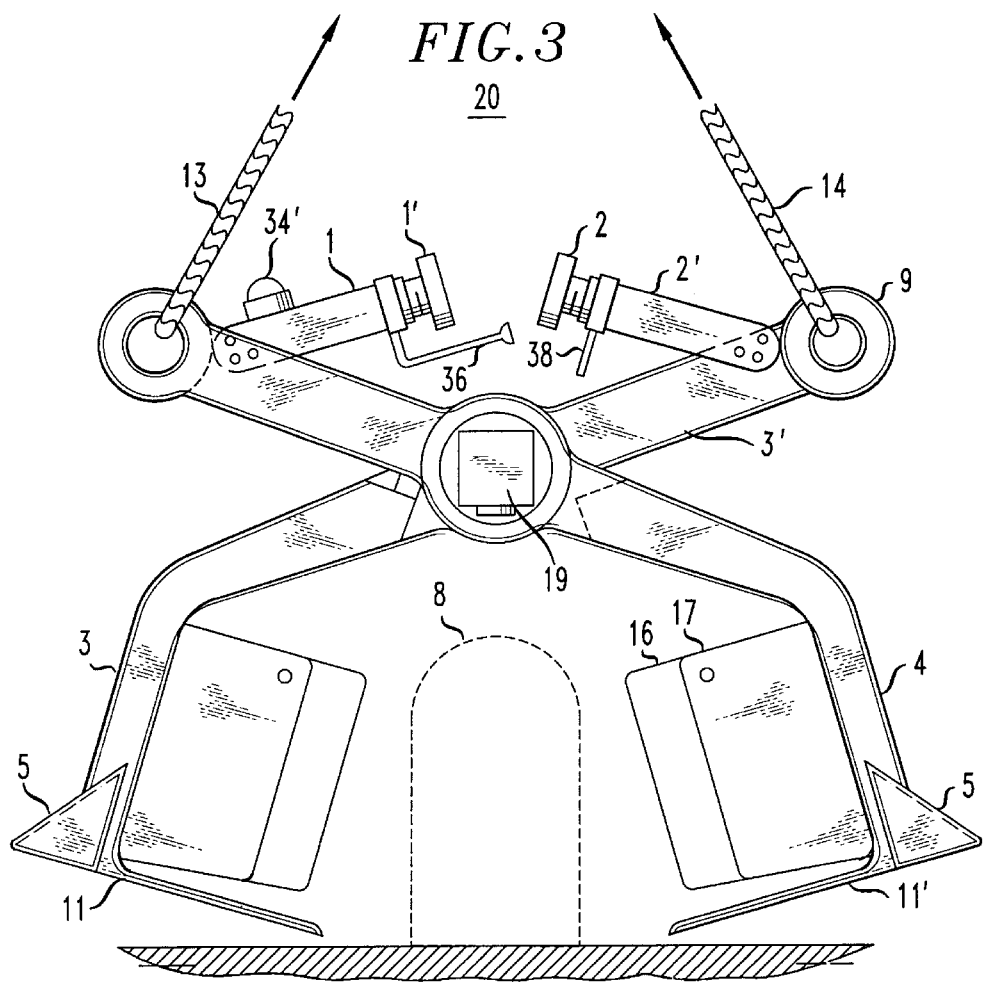
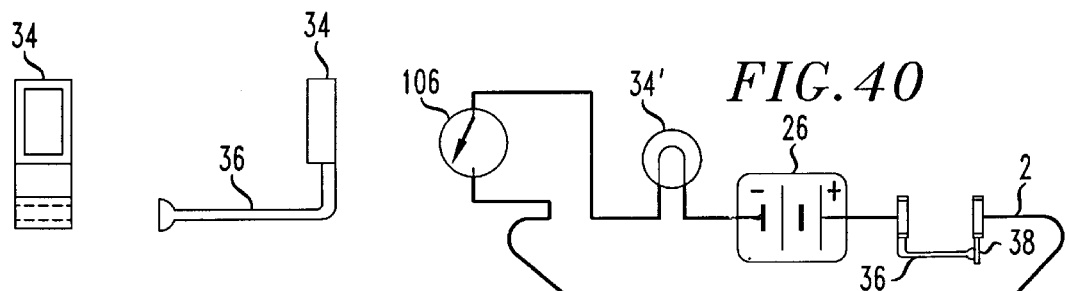

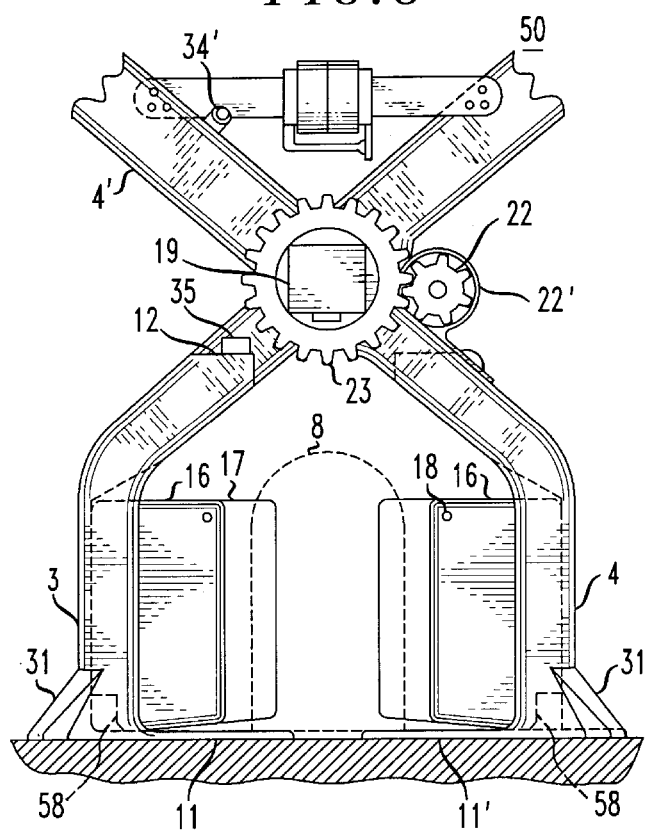
FIG. 6
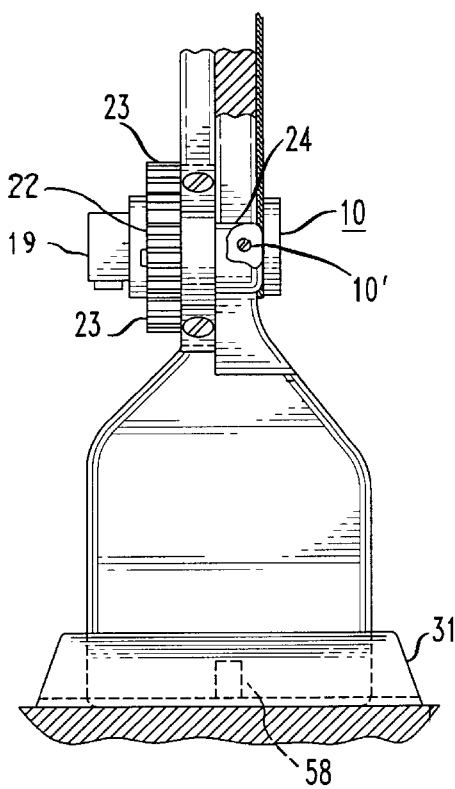
FIG. 7
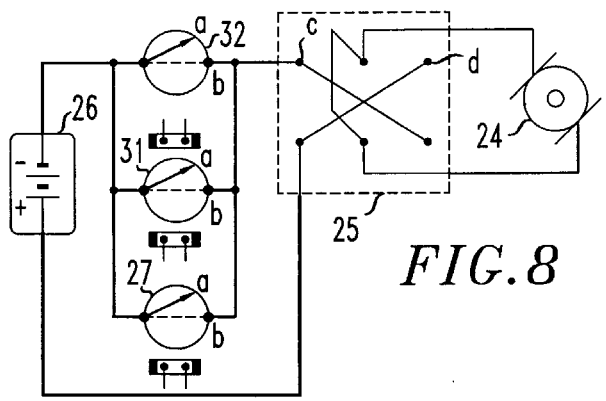
FIG. 8
FIG. 9
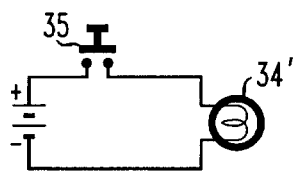
FIG. 11
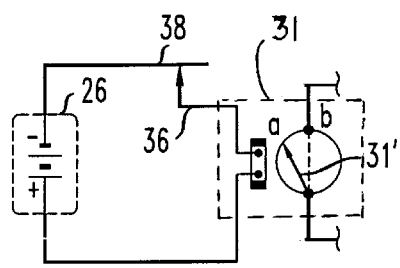
FIG. 10A FIG. 17A  FIG. 18  FIG. 17B
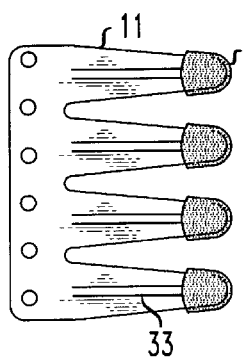  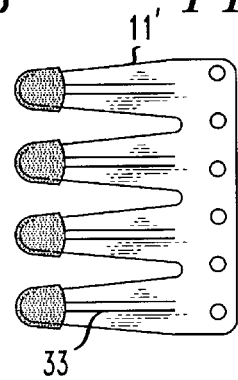
FIG. 19A  FIG. 20  FIG. 19B
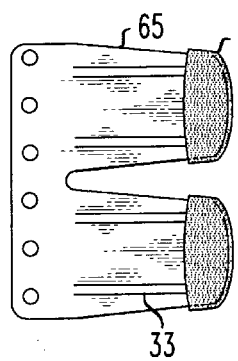  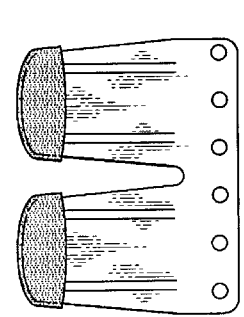
FIG. 21A  FIG. 22  FIG. 21B
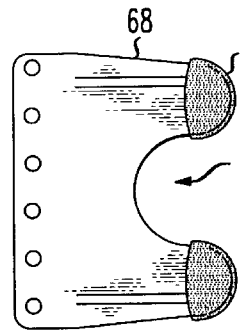 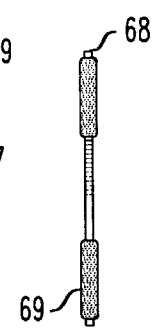 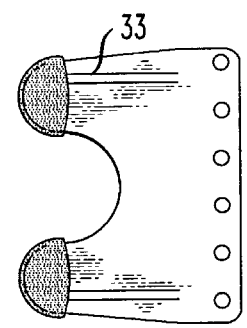
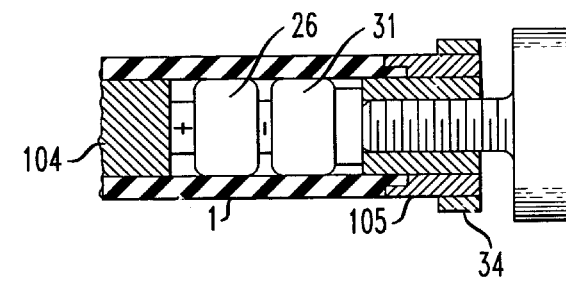
FIG. 39

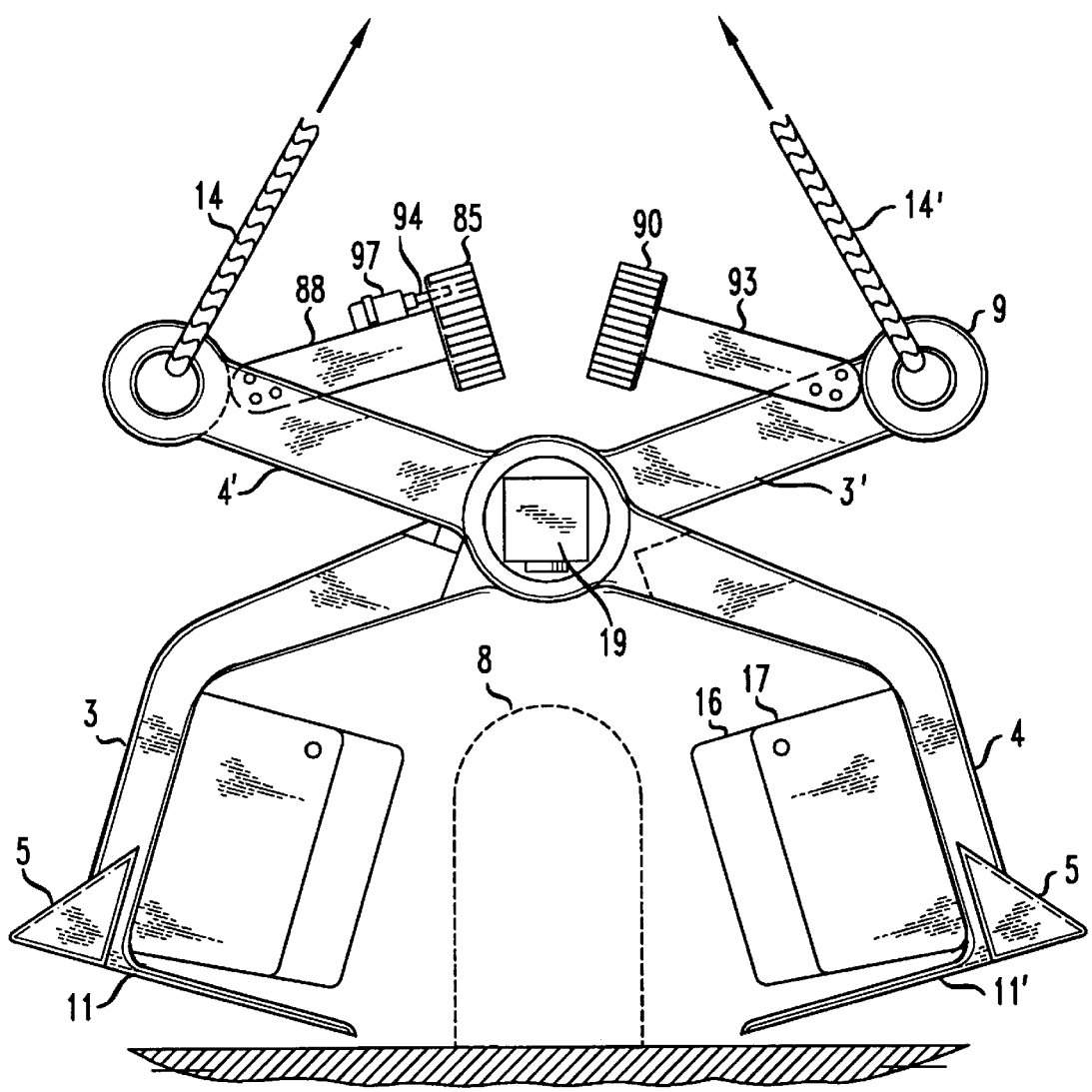

AUTOMATICALLY-ACTUATED CARGO AND PERSONNEL SCOOPING APPARATUS WITH STRAIN GAUGES, FINGERS AND SENSORS

CROSS-REFERENCES TO RELATED APPLICATIONS

This is not a continuation-in-part of a previous application, nor one that is co-pending.

RIGHTS TO INVENTIONS MADE UNDER FEDERALLY-SPONSORED RESEARCH AND DEVELOPMENT

None of the work on this invention was performed under any Federally-Sponsored or State-Sponsored research and development. Gabriel used his own resources on every phase of his project.

BACKGROUND OF THE INVENTION

1. Field of the Invention

This invention is in the field of load-snatching, material-handling and personnel rescuing apparatus, in which the entire load is scooped up without the need of hoist cables and hooks. The apparatus utilizes a helicopter as a means of supporting and assisting in the load-lifting and releasing operations. This disclosure with illustrations describes how the task can be performed more precisely.

This disclosure with illustrations describes how the task can be performed more precisely and with less possibility of the apparatus causing any injury to the load. To assist in obtaining this goal, the extensions at the bottom of the lower portions would have resilient, flexible fingers or extensions thereof, and have resilient material fastened to the lower exteriors of the two lower portions, which could help stabilize the apparatus when resting on a platform. The material could be rigid, replaceable packing foam. Other than the above, no such cargo handling apparatus is known to the applicant having the improvements for precisely grabbing a load, without damaging the load.

2. Description of Prior Art

The inventor is only aware of patents issued under his name that relates to his present invention. U.S. Pat. No. 5,209,538 dated May 11, 1993 on a similar apparatus has the appearance of the present one but lacks the surveillance and automatic features, needed for a reliable, workable scooping operation. In this invention, the helicopter pilot can see where the apparatus is in relation to the object to be retrieved. Also the pilot now has the ability to control and actuate the separation or the engagement of the, apparatus' lower portions. This invention has sensitive fingers or extensions thereof with strain gages to sense the fingers ability to get underneath the load to be retrieved. In addition no magnets, including bipolar, exist at the hammerheads to produce their repulsion or attraction in order to separate or engage apparatus' lower portions, for positive-secure-load-retention.

Another one by Gabriel, U.S. Pat. No. 4,678,220, dated Jul. 7, 1987, also describes a tongs-like lifting apparatus for loading and unloading containerized cargo, but this one has less relationship to the present one, in that the hammerheads and inflated pillows are missing. Gabriel's other patents, such as U.S Pat. No. 4,943,099, dated Jul. 24, 1990, relate to cargo hooks with hoist cables that need to hook on to a cable attached to the load to be retrieved. They are incapable of snatching the entire load, such as containerized cargo.

SUMMARY OF THE INVENTION

This is a multi-purpose cargo, personnel lifting apparatus with automatic loading and unloading capability, suspended from either a derrick or a helicopter.

Because of its ability to scoop up the entire load automatically and remotely without the aid of ground personnel, this apparatus could be of much assistance to the military for rescue missions of incapacitated personnel on the battlefield, or in rough seas, from roofs of burning buildings or from areas to which a poisonous gas may have been emitted.

This apparatus has the ability to locate cargo or personnel, to scoop up the load and provide secure positive-load-retention until it is safely delivered to a desired site, with the cooperation of the helicopter pilot. The load can be scooped up remotely with the aid of distance-measuring and actuation sensors and a CRT monitor in the helicopter cockpit. No assistance from ground personnel or action by the person being rescued would be required in the retrieval process.

As in previous U.S. Pat. No. 5,209,538, this apparatus comprises two elongated members, somewhat vertical and curved toward each other at lower portions and pivoted at a selected distance from their top ends. This apparatus, too, has hammerheads extending toward each other from the insides of its upper portions, to receive all of the horizontal stress that may be imposed on the apparatus' lower portions. Because of the apparatus' distribution of weight, with the added weights on top and/or from assistance of an extension coil spring, the device's lower portions close automatically when tension is applied to the hoist cable upon life-off. To assist in the automatic scooping operation, two distance sensors are provided, one near the bottom of each of the two lower portions. In addition, strain gages are imbedded in the recesses of the wide fingers extending inward from the bottoms of the apparatus' lower portions. When one or more fingers make contact with the surface below, they bend and a voltage is produced and power amplified to cause an actuator to close the separation between the apparatus' lower portions. The fingers extend underneath the load, thus enabling it to be scooped up. Permanent magnets or electromagnets could help retain the load within the apparatus under all environmental conditions. Meanwhile, the pilot of the helicopter is being provided with a display on his CRT screen, as to what is going on at the site below in the scooping operation, and observing the progress of the operation. The apparatus' magnets, fingers, etc, are all needed for a workable system.

BRIEF DESCRIPTION OF DRAWINGS

For the purpose of illustrating the precision capability of locating, positioning and scooping up a load with this automatically-actuated apparatus, the following drawings show forms which are presently preferred. It is to be understood that this invention is not necessarily limited to the precise arrangement, instrumentalities and field of utility as therein demonstrated.

FIG. 3 is a front view assembly of the apparatus, showing its upper and lower portions separated. The load is shown in dashed lines.

FIG. 4A is a front view of the bracket suspended from the upper left horizontal arm with a finger extending to another bracket with a stopper extending downward.

FIG. 4B is a side view thereof.

FIG. 5A is a front view of a second bracket suspended from upper right horizontal arm with a stopper portion extending downward.

FIG. 5B is a side view thereof.

FIG. 6 is a front view of the apparatus in which a large spur gear is meshed with a pinion gear, and the pinion gear attached to a motor. The pinion rotates the large gear, both to separate its lower portions and to bring them together when wanting to scoop up a load.

FIG. 7 is a side view thereof.

FIG. 8 is a circuit diagram of the motor, the DTDP switch and the SPST switch for the apparatus of FIG. 6, and two relays.

FIG. 9 is a detail drawing of the motor with the pinion gear frictionally attached to the motor shaft.

FIG. 11 shows a push button circuit with a light bulb and voltage supply, as back up, for the strain gages on the wide inward-extending fingers at the bottom of the apparatus' lower portions

FIG. 10A shows the circuit for FIGS. 4A to 5B of apparatus in FIG. 6, in which supplied voltage activates the relay's arm to open the motor circuit.

FIG. 17A shows the fingers at one lower portion bottom of the apparatus, shown in FIG. 2, with teflon or rubber sleeves at their ends. Ribs are shown at the underside of the fingers to assist in their sliding underneath a person that is to be scooped up.

FIG. 17B shows the wider fingers at the other bottom of the apparatus.

FIG. 18 is an end view of the fingers.

FIG. 19A–B shows two wider extentions, instead of four fingers extending toward the center of the apparatus, and screwed on to the bottoms of the lower portions.

FIG. 20 is an end view thereof;

FIG. 21A shows an extension that would be screwed on to the bottom of a lower portion with two projections. A semi-circular opening at its outer edge allows a person to stand up at the center of the apparatus, after having landed on a platform or terrain, to permit the apparatus' lower portions to separate, before he exits from the apparatus.

FIG. 21B shows an extension for the other bottom of the apparatus.

FIG. 22 is an end view thereof.

FIG. 39 shows a cross section of the left bar near the top of the apparatus of FIG. 6, indicating the presence of a battery and a relay for turning off the motor when the lower and upper portions of the apparatus come together.

FIG. 40 shows a combination line and circuit diagram of the upper halftop of the apparatus of FIG. 1, showing a battery for turning ON the light bulb when the upper and lower portions of the apparatus come together.

DESCRIPTION OF A PREFERRED EMBODIMENT

Figure 1:
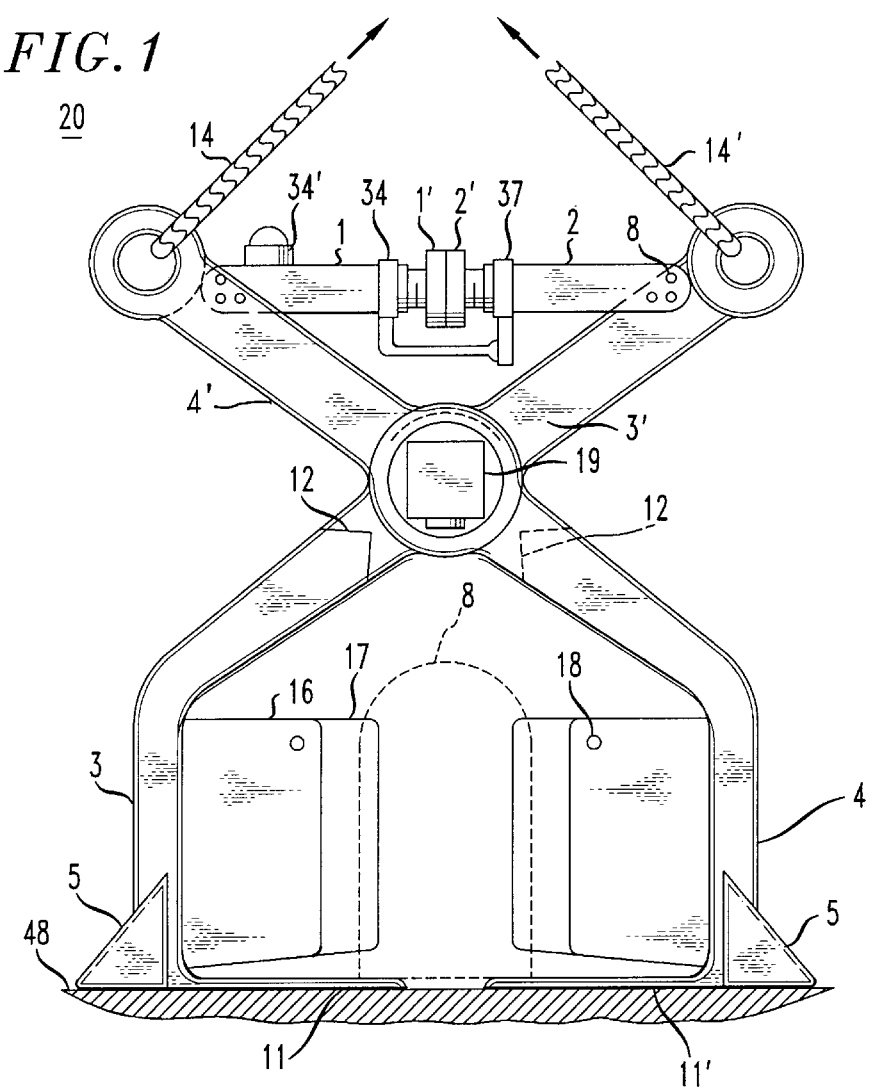
FIG. 1 is a front view assembly of the apparatus, showing the upper portions, the pivot pin and the lower portions with inflated pillows fastened to its walls and pillow-like sponges fastened to each of the two inflated pillows.
Figure 2:
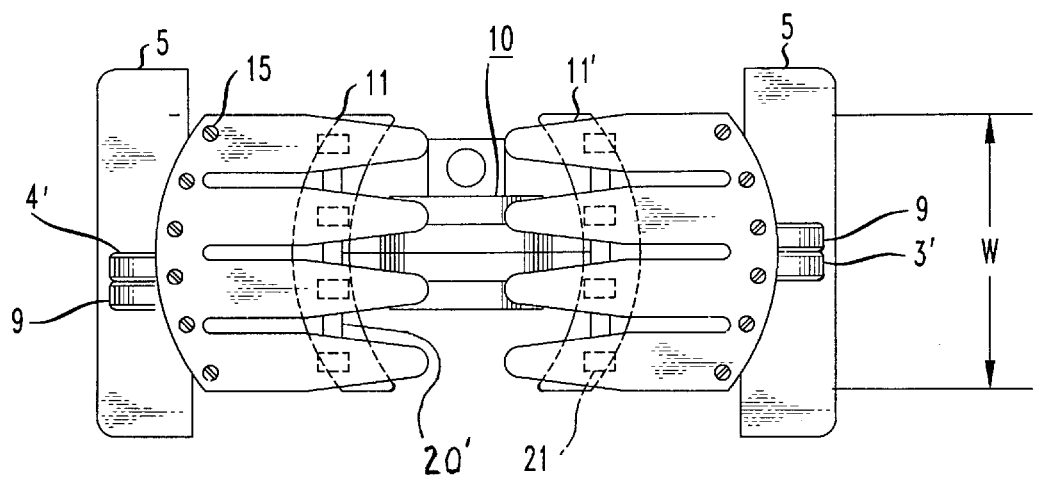
FIG. 2 is a bottom view of the apparatus showing the flexible dull fingers extending inward from the bottoms of the lower portion in closed position.

Apparatus 20, shown in FIGS. 1, 2 and 3 would be suspended from a helicopter and designed to scoop up either a person or a lightweight containerized cargo as the load, and to transport such a load from one site to another preferred site. The structural design of the apparatus would be similar to those shown in Gabriel's previous U.S Pat. No. 5,209, 538.

Figure 12:
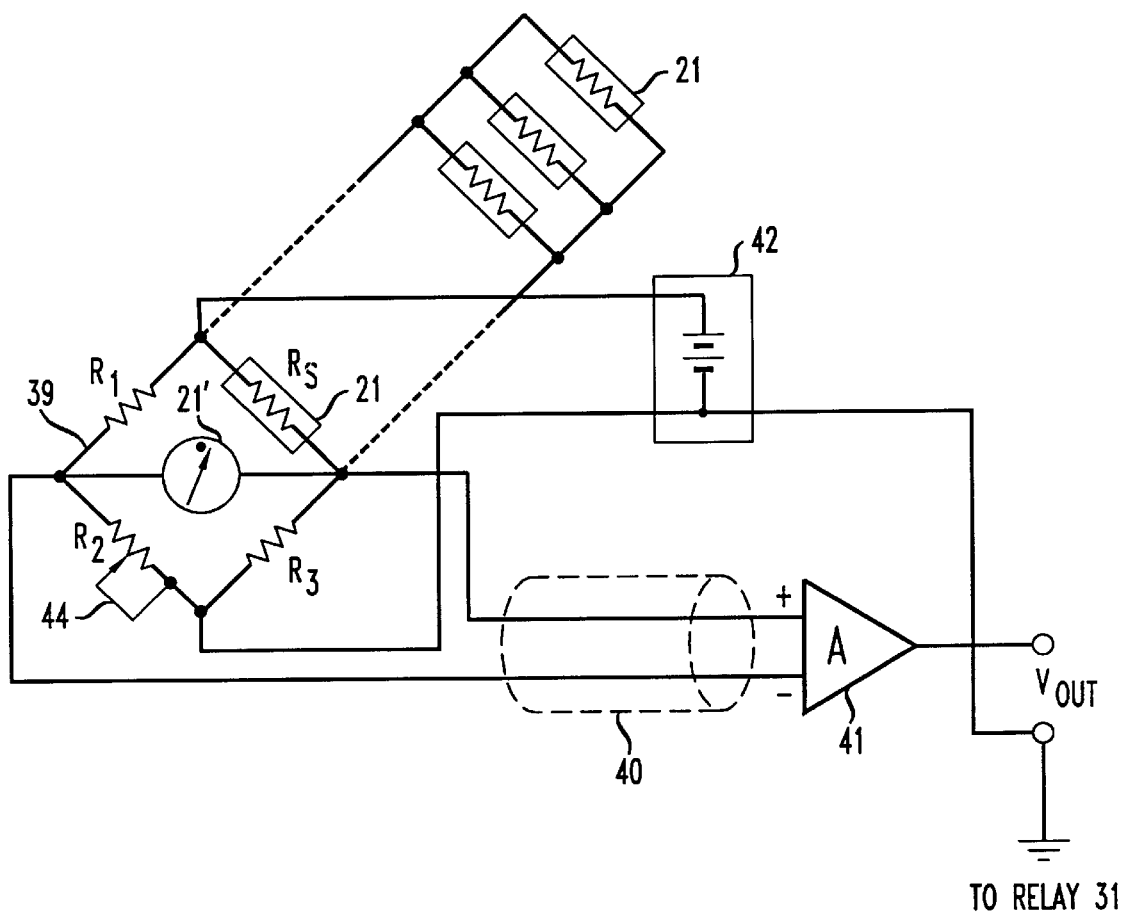
FIG. 12 shows a diagram of a wheatstone bridge with a strain gage in one leg of the bridge, by twisted and shielded wires, connecting the bridge to an amplifier; any unbalanced voltage from the bridge is amplified for application to a relay circuit to start or stop the motor.

This apparatus includes a surveillance camera 19 to assist in locating the load, and for easily scooping up the loads wide fingers 11, flexible, of plastic, laminated wood, or lightweight metal extending inward for getting underneath the load and, located at the apparatus' bottom. On the inside of each finger 21 is located a strain gage where the bending would be maximum. A strain gage is a device for electrical measurement of mechanical stress quantities. It operates on the principle of proportional variation of electrical resistance to strain. There are various types. The one suggested here could be either a bonded-metallic-wire gage or a foil resistance gage. Movement or strain in finger 21, is transmitted to the grid of the gage through the adhesive that bonds the gage to the structure. Because of its sensitivity for measuring resistance, a wheatstone bridge circuit, shown in FIG. 12, is used in the strain gauge circuit. The bridge is balanced prior to mechanical strain, but when strain occurs, the bridge becomes unbalanced and voltage occurs at Vout, FIG. 12; Vout is a voltage amplified via amplifier 41 and introduced to the coil of a mechanical relay to close the motor circuit. Push button circuit, FIG. 11, would inform the pilot or, operator, that they have separated the maximum amount and to reverse the direction of rotation of dc motor 24, via DTDP switch 25, to permit fingers 11 and 11' to slowly close together under load 8. When the fingers have come the closest to each other, then so have hammerheads 1' and 2'; they have abutted, as designed. Then apparatus 20 may be hoisted.

It should be added that in FIG. 1 motor 24 and associated gearing have been omitted, while in FIG. 6 they exist. The above description applies to FIG. 1 while referring to FIG. 6 and FIG. 8 for the motor and its circuit.

Now to go through the entire procedure of retrieving a load for transportation to another site, the following actions are described to occur: when apparatus 50 is being lowered to the location of the load, monitored by the pilot, its lower portions 3 and 4, FIG. 3, separate fully automatically at about 4 to 6 feet from the ground, or surface below, directly over load 8. IDEC's ultrasonic sensors 38 are suggested for performing this sensing operation by causing motor 24 to rotate via pinion and separate lower portions 3, 4. When fingers 11 and 11', FIG. 2, of the lower portions extensions make contact with the surface below and bend, signals from strain gages 21 open motor circuit via relay 31. then DPDT switch, FIG. 8, is thrown into reverse polarity, and load 8 is slightly lifted by hoist cables 14, 14', to allow fingers to straighten and thus allow relay 31 to close. Then motor 24 rotates to bring lower portion 3 and 4 together. Fingers 11 and 11', with rounded ends, being thin and slippery on their top surfaces, should easily slip underneath light load 8, in order to hoist and transport it elsewhere. In FIG. 2, the fingers are interconnected with strips 20' to strengthen them and enable the fingers to beter able to support an object. Inflated pillows 16 and soft sponges 17, FIG. 6, help to secure load 8 snugly, while it is being hoisted upward. When lower portions with fingers 11, 11', FIG. 6, close completely, motor 24 stops rotating, because of the end of non-corrosive metal extension 36 making contact with non-corrosive metal stopper 38, FIGS. 4A and 4B. When lower portions come together, so do upper portions 3' and 4', Loop of circuit 10A closing causes relay 31 to open motor 24 circuit; thus, motor 24 stops rotating.

Figure 10:
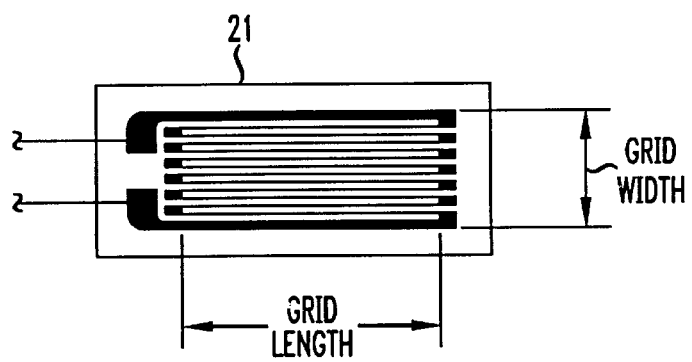
FIG. 10 shows a representative foil strain gage having the symbol 3/35 0LY11.

Pinion's hub 28 is held onto motor shaft with friction and cap 29, so it can rotate slowly until circuit of 10A takes effect, causing motor to stop rotating. Reversal of motor is performed manually via DPDT switch 25, when required, to either separate lower portions or bring them together. FIG. 12 shows a typical wheatstone bridge circuit. FIG. 10 shows a typical strain gage, which may be only one-half inch long, manufactured by Hottinger Baldwin, gage having symbol 3/350LY11. Lead line of numerical 21' points to the null detector.

DESCRIPTION OF A PREFERRED EMBODIMENT

Load-lifting apparatus 20 is portrayed in the assembly drawings, FIGS. 1, 2, 3. One will note that with pivot pin 10 and upper and lower portions 3', 4' and 3, 4, respectfully, apparatus 20 resembles ice tongs in appearance, with some noteworthy deviations. Apparatus 20 is shown with hoist cables 13 and 14 attached to holes at upper portions 3', 4'. The deviations from ice tongs include hammerheads 1' and 21, bars 1, 2 with coils, enlarged width W, FIG. 2, pillows 16 and sponges 17. Lower portions 3 and 4 are rectangular-shaped having somewhat long-pointed flexible fingers 11 and 11' protruding at their bottoms, for gently scooping up a person lying down. In FIG. 1, a lightweight container 8 is shown in dashed lines. FIG. 1 shows apparatus 20 with its portions in a closed position, while FIG. 3 shows the apparatus with its lower portions fully spread apart, prior to their scooping up a load. Fingers 11, 11' have rounded ribs 33, FIGS. 17A, 19A, 21B, a tough slippery material like Teflon on their upper surfaces, to assist their sliding under a load, such as a person lying down or sitting up on terrain. Camera 19, FIGS. 1, 3 and 6, enables the aircraft pilot to locate the load, via CRT 46, FIG. 131 when lowering either apparatus 20 or 50, and to have it placed directly above and over load 8. Another approach would be to lower apparatus 20 beside load 8 and have its lower portions make contact with the surface or terrain below, then move the apparatus sideways by means of hoist cables 14 and 14' toward the containerized load, so it straddles the load, before scooping up the load by pulling on the hoist cables. It would help in the scooping-up process to have the load resting on a riser. In releasing a load at a desired site, the reverse operation would take place. After load 8 has been allowed to be released on surface 48, FIGS. 1 and 3, apparatus 20, with its lower portions 3 and 4 separated, could be moved sideways by hoist cables 14 and 14' before being hoisted upwards.

In this simplified version, bars 1 and 2 would have insulated windings, with ferrous metal bars 1 and 2 forming the cores of electromagnets.

Figure 14:
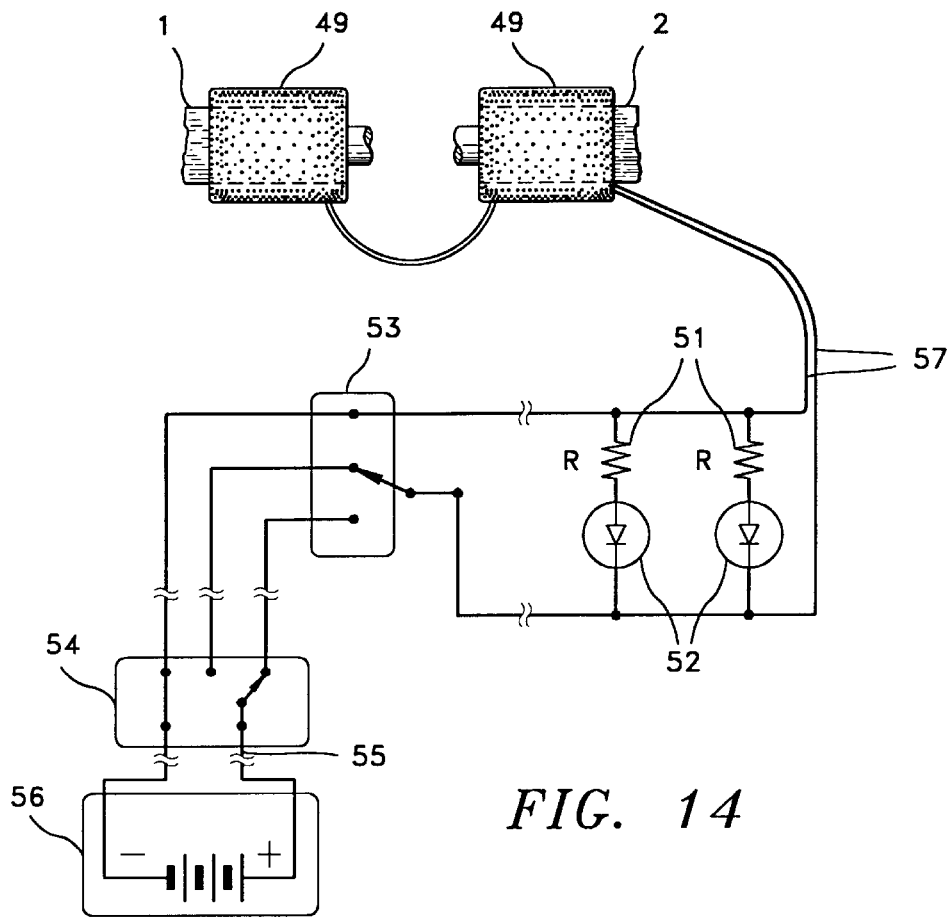
FIG. 14 shows a schematic of the wiring for two electromagnets to provide repulsion of the hammerheads when separation of the lower portions is required.

When it is desired to remotely retrieve a load, one would apply power, via voltage supply 56, FIG. 14, to electromagnets 49 and 49'. FIG. 14, is a schematic of the wiring for the two electro-magnets to provide a repulsive force to hammerheads 1 and 2, FIG. 1, to urge them to separate, prior to having apparatus 20 straddle load 8. FIG. 14 shows two coils 49, 49', connected to LEDs 52, in series with resistors 51. The LEDs are to be located, one on each side of apparatus 20. The LEDs illuminate when dc voltage source 56 is applied to the two electromagnets, via 2-way, 3-wire switches 53 and 54. Switch 54 and supply 56 may be located in the aircraft while switch 53 may be located on apparatus 20. Wires 55 run from supply 56 to 2-way, p3-wire switch 54, then to 2-way switch 53 before becoming two wires again when they are applied to coils 49 and 49'. When insulated wires are wrapped around ferrous steel members 1 and 2, the resulting coils can become electromagnets, when excited, producing lines of magnetic force in a closed loop 13. Strong magnetic lines of repulsion are formed when hammerheads are in contact, when dc voltage is applied, causing both hammerheads 1' and 2' and lower portions 3 and 4 to separate. Apparatus 20 being lightweight and without a load, the separation would easily occur and continue for several inches, the amount of separation depending upon the magnitude of voltage applied, the number of turns in coils 49, 49', the cross-sectional area and material of the core.

The force of repulsion may be obtained as follows:

$$\text{Flux} = \phi = \mu_r \frac{NIA \times 10^8}{l} \text{ maxwells}$$

$$\text{Force of Repulsion} = F = \frac{10^{-6}\phi^2}{72.1A_l} \text{ lbs.}$$

Where $\mu r$=relative permeability of core material
N=turns of wire
I=current in amperes
A=core cross-sectional area, sq. meters
$A_1$=cross-sectional area, sq. inches
l=length of winding, meters
$\phi$=maxwells Ref. Lowe's "Direct and Alternating Currents" published by McGraw-Hill Book Co.

As the air gap between the hammerheads increases, the repulsive forces greatly (exponentially) decreases. Consequently, it is desirable to have cargo 8, that is somewhat roundly pointed on top, to aid in the separation of lower portions' protrusions, namely fingers 11 and 11', as apparatus 20 is being lowered by cables 14 and 14'.

Figure 23:
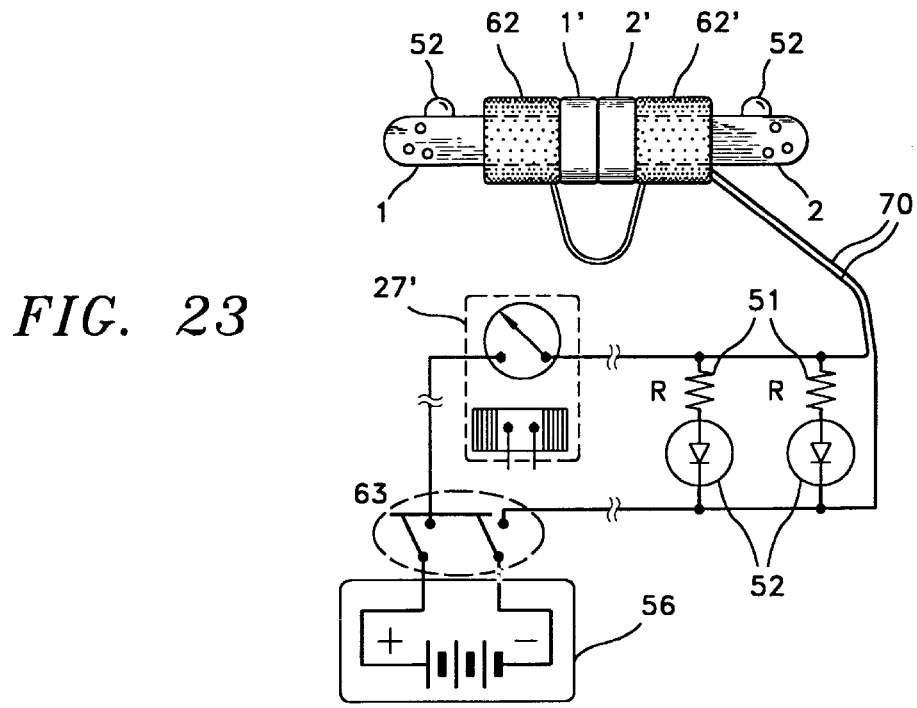
FIG. 23 shows an alternate circuit for the wiring of the two electromagnets shown in FIG. 14, to provide power to energize the electromagnets automatically via closing of relay when distance sensor of FIG. 15 senses an object below.
Figure 15:
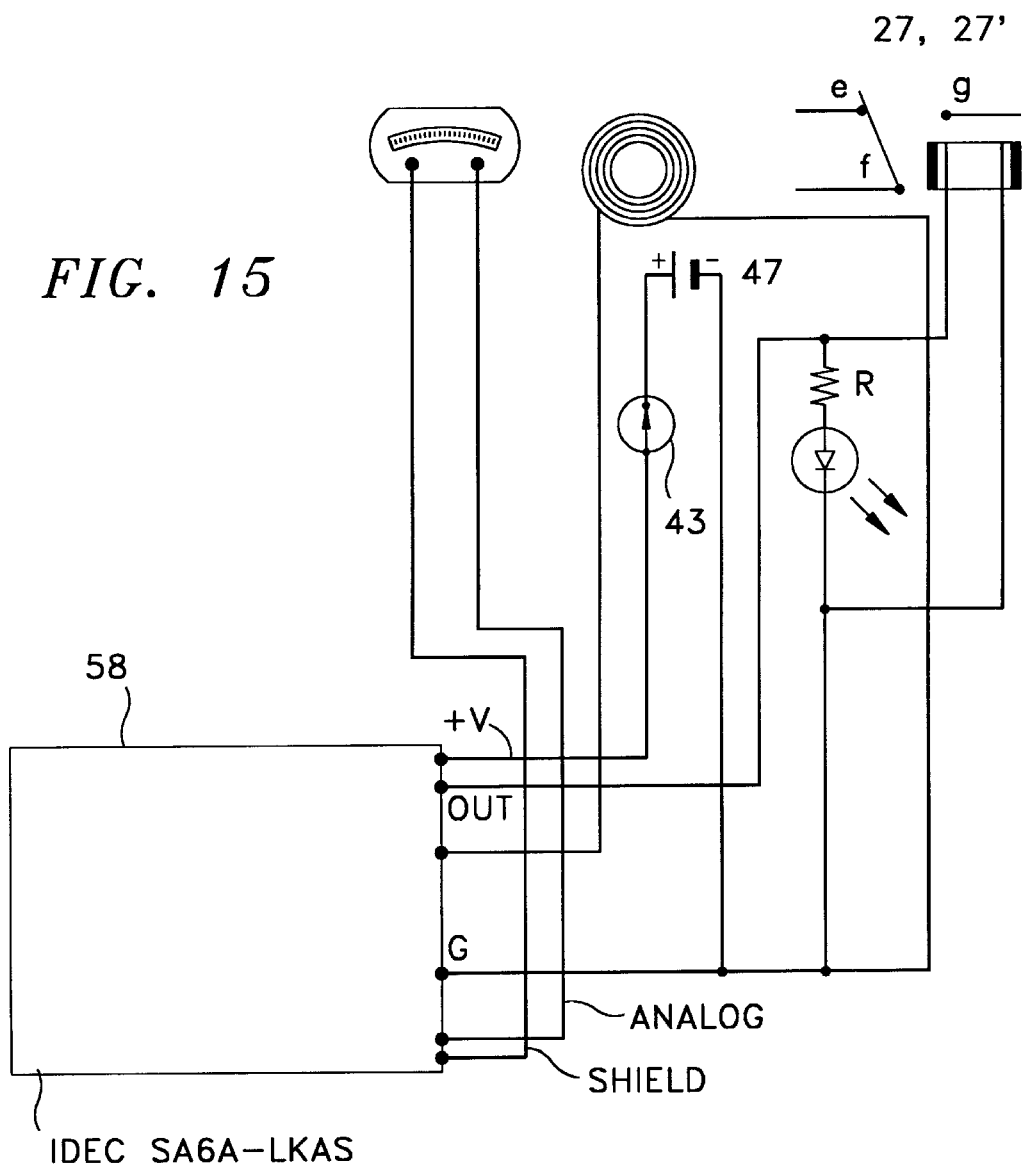
FIG. 15 shows a block diagram of the ultrasonic sensor showing its electrical output being applied to a meter, an alarm and a relay.

Switch 53, FIG. 14, could have a relay substituted such as relay 27, to switch on the electromagnets 49 and 49' via a signal from ultrasonic distance sensor 58, FIG. 15. FIG. 23 shows a schematic of the wiring for two electromagnets 62 and 62', to provide a repulsive force when relay 27 is closed by distance sensor 58, when apparatus approaches a height of about 40 inches, from a platform or an object below, such as load 8. In FIG. 23, the hammerhead threads have been omitted and the positions of the LEDs 52, are shown on bar 1 and 2. When one wishes to open the circuit manually at the cockpit's location, one can do so using DPST switch 63. This would assure the pilot that a repulsive force does not exist at hammerheads 1'2'. Power supply 56 would be located on aircraft. In the schematic of FIG. 23, lower portions 3 and 4 of apparatus 20 separate automatically, while in FIG. 14, the separation is performed remotely by remotely toggling 2-way, 3-wire switch 54.

The procedure to retrieve a load using apparatus 20 of FIG. 1 is described below.

Figure 13:
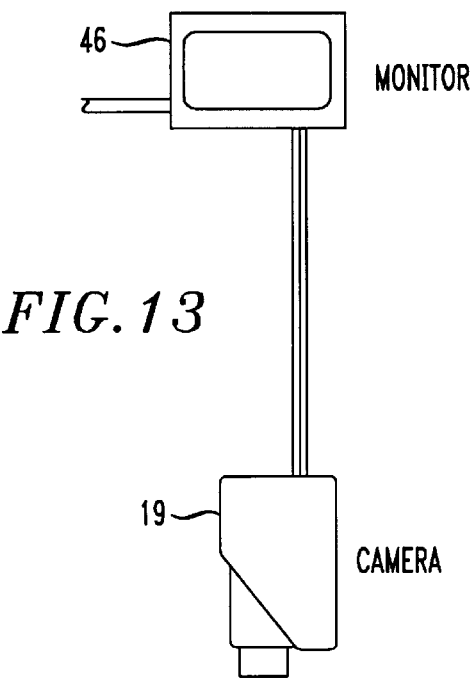
FIG. 13 shows a physical diagram of the Radio Shack miniature surveillance camera with its electrical wires tied and connected to a CRT monitor located in the helicopter cockpit.
Figure 16:
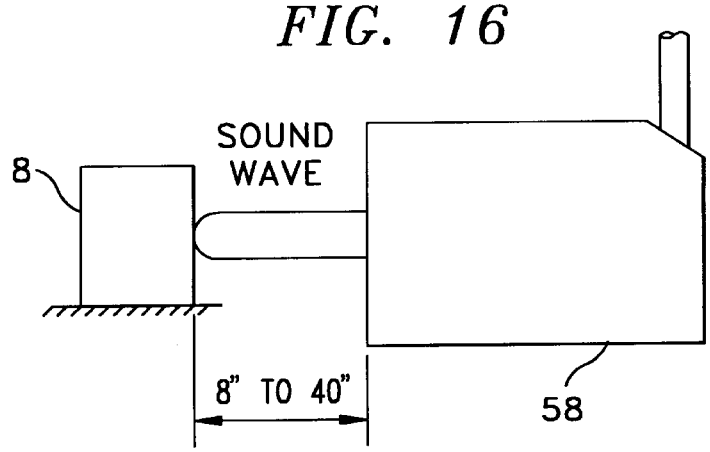
FIG. 16 shows another block diagram of the sensor with its sound, wave output reflecting on a containerized load.

Apparatus 2 is lowered from a helicopter by hoist cables 14 and 14', using a winch and the hoist mechanism in the aircraft. When ultrasonic distance sensor 58, IDEC SAGA-LK4S, FIGS. 15, 16, senses the presence of cargo or a platform or terrain below, after having been detected by the pilot via CRT 46, FIG. 13, at a height of about 40 inches, voltage is applied to electromagnets 49, 49', FIG. 14, via conductors 55, switch 54, switch 53 and additional conductors 57. When voltage is applied, LEDs 52 illuminate informing the pilot that voltage is being applied to the electromagnets, and because of like-polarity faces of hammerheads 1' and 2, upper and lower portions of apparatus 20 begin to separate. They separate further when hoist cables, 14, 14', become lax because of weights 9 at top of apparatus.

Then, when lower portions are fully separated, as they straddle load 8, switch 54 in aircraft is opened, removing excitation from electromagnets 49 and 49'. Then as hoist cables are very slowly pulled up, fingers 11 and 11' get underneath load 8 with resilient sponges 16 embracing the load, as lower portions come together. Thus, load 8 can be hoisted upward by the hoisting mechanism in the aircraft; to be transported to a desired site. Stabilizers 5, for enabling apparatus to remain upright on the platform are of lightweight resilient plastic material.

For heavier loads, instead of 8 fingers 11 and 11', there would be four wider fingers 65, FIGS. 19 and 20. Each finger has a Teflon sleeve covering its end. Each finger has at least one Teflon slender strip or rib 33, fastened and running along its underneath to aid in each finger getting underneath a load, as shown in FIGS. 18 to 22.

In FIG. 1, lower portions 3, 4, are essentially together with hammerheads 1' and 2' making contact. Bars 1 and 2 are fastened to upper portions by screws 8'. Hammerheads 1' and 2' can be adjusted to move in or out by rotating them on the threads supporting the heads; to separate or close in lower portions 3 and 4. Pillows 16 can be inflated as desired to accommodate the size of load 8. A sponge-like resilient material 17 is adhered to the exterior face of inflatable cushion 16. The sponge, in addition to embracing load 8 snugly, protects pillows 16 from being pierced by a sharp object, and deflating. Recesses 12 in lower portions allow portions 3 and 4 to rotate about pin 10.

To provide electromagnets 49 and 49', bars 1 and 2 form cores for the windings. Bars 1 and 2 and upper portions of apparatus 20 are fabricated of soft steel, in order to retain less residual magnetism when switch 56, FIG. 14, is opened.

A tension spring from upper portion 3' to lower portion 4, FIGS. 1 and 6, may be added as a substitute for weight 9, in order to make apparatus lighter in weight. The tension spring, is shown in U.S. Pat. No. 5,209,538, dated May 11, 1993, FIGS. 1 and 3.

FIG. 23 shows an alternate circuit for the wiring of the two electromagnets shown in FIG. 14, to provide power to energize the magnets, 62 and 62', automatically. The power is applied to the circuit by the closing of relay 27' when ultrasonic distance sensor of FIG. 15 detects an object below. Power is supplied from power source 56, via DPST switch 63 and wires 70, to the electromagnets. The magnets are connected in series and repel each other when energized. The threads forscrewing hammerheads in and out have been eliminated to provide more length for the coil windings. Locations of the two LEDs 52 on bars 1 and 2 are shown in FIG. 23.

Figure 24:
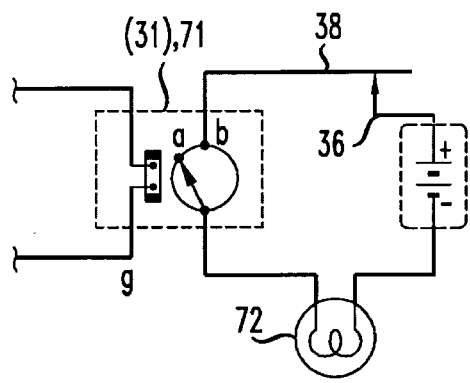
FIG. 24 shows the circuit for FIGS. 4A to 5B of apparatus in FIG. 1 in which voltage supplied by an energy source causes the relay to close to illuminate a light bulb, thus informing the pilot that lower portions of apparatus of FIG. 1 are in a closed position

FIG. 24 shows the circuit for FIGS. 4A to 5B of apparatus 50, FIG. 6, in which voltage supplied by an energy source causes relay 31 to close. In-closing the circuit, light bulb 34' illuminates, thus informing the pilot that lower portions 3 and 4 of apparatus are in a closed position. FIG. 24 shows a circuit in which a suspended fingerlike extension from a horizontal bar, FIG. 4B, makes contact with a suspended stopper, FIG. 5B, from an opposite such bar to open the motor 24 circuit when hammerheads abut, indicating that lower portions 3 and 4 have come together, In place of relay 31 with two coils, FIG. 8, relays 30 and 71 have been substituted in FIG. 25. Relay 30 is activated by a signal, provided from strain gauges' circuit. FIG. 12; and relay 71 opens the circuit when finger 36, FIG. 4B, makes contact with stopper 38, FIG. 5B, as indicated in FIG. 24. The remainder of the circuit FIG. 8, is the same.

Figure 26A:
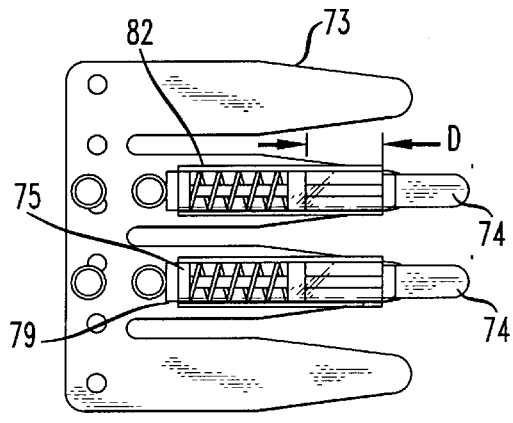
FIG. 26A shows a top view of the left side fingers for scooping up a person. Two of the fingers are shown with extensions.
Figure 26B:
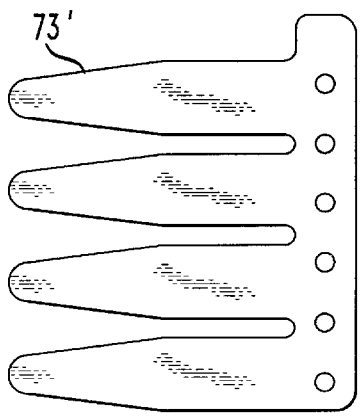
FIG. 26B shows a top view of the right side fingers for scooping wherein the fingers are capable of meshing with those of FIG. 26A.
Figure 27:
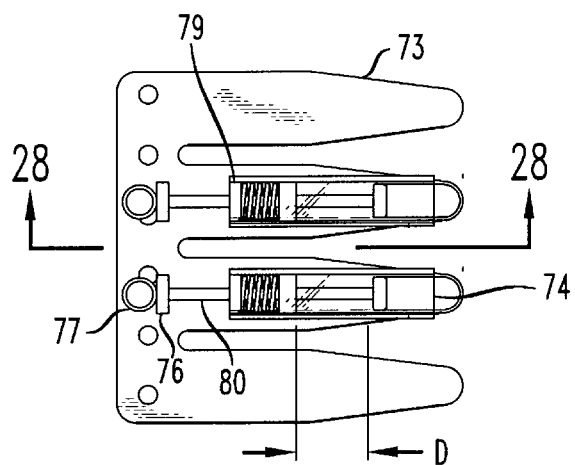
FIG. 27 shows a top view of the left side of fingers, the two retracted by springs, shown in the contracted state.
Figure 28:
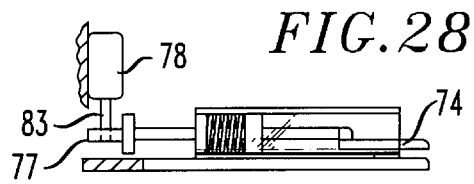
FIG. 28 shows a side sectional view thereof, with an elevational view of the solenoid with its plunger extended into a collar. The collar is attached to the spring and finger-extension assembly.
Figure 29:
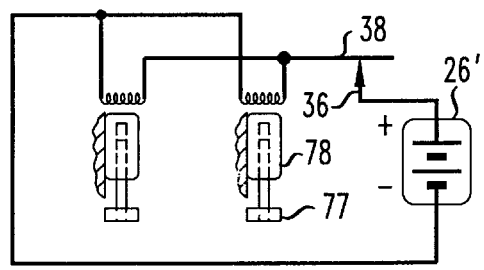
FIG. 29 shows the circuit diagram for two solenoids, stopper and extension contacts, shown in FIG. 1, and power supply, for extending fingers of FIG. 27, when hammerheads make contact.
Figure 30:
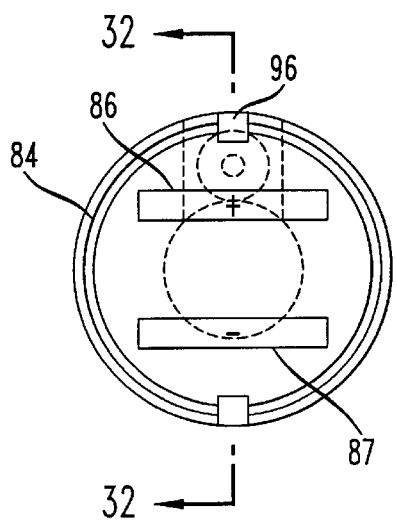
FIG. 30 shows the end view of a bipolar off-the-shelf permanent magnet surrounded be a cylindrical metal casing.
Figure 31:
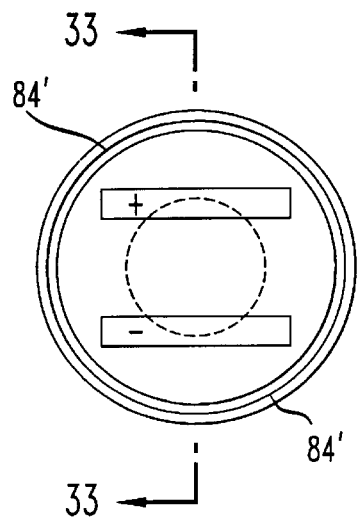
FIG. 31 shows an identical bipolar magnet rotated 180°, but with a different support casing.

To improve the apparatus' ability to scoop up a person and securely hold him in place, FIGS. 26A and 26B have been provided. Finger extenders 74, FIG. 26A, shown. Initially, assume that these extenders and their associated springs are nonexistent. Fingers in the figures are spaced so that they are capable of interdigitating, or meshing like teeth of two spur gears, when lower portions 3 and 4 come together. The partial intermeshing of fingers provided openings for any scooped up water or dirt to pass through. Hence, the additional unwanted weight of water or dirt would not be included on fingers 73, FIG 26A, and fingers 73', FIG. 26B, in the haul of a desired object. The amount of interdigitating depends on how long one would want to extend fingers 73. The extenders could be an optional feature. In some situations, specially wherein small-sized loads are concerned, one would desire the extenders to assist in securely holding load 8 in place, as it is being hoisted. The operation of the finger extenders 74 is described below. Extenders 74 are connected to springs 75 by rod 80. Disk-shaped cap 81 fastened to spring 75 moves back and forth with spring. The coiled spring moves inside of a casing 82, assumed to be transparent. Casing 82, could be elliptical-shaped, to project a low profile. Casing 82 and rear cap 79 are fastened securely to finger 73. Disk 76 is attached to both rod 80 and collar 77. Rod 80 is attached to both disk 81 and finger extender 74, as shown. Distance D, FIG. 26A, need not exists enabling spring 75 to be longer. Plunger 83, FIG. 28, of solenoid 78 passes through collar 77, when de-energized. When solenoid is energized when stopper 38 makes contact with finger 36, FIG. 29, Solenoid's plunger 83 is pulled in or retracted. That is when compressed spring 75 extends out;, pushing finger extenders 74 out toward the bottom center of the apparatus, as shown in FIG. 26A. In FIG. 27, extenders 74 are retracted, with plunger passing through hole of collar 77. The process of having plunger 83 pass through hole in collar 77 is performed manually prior to lowering apparatus 20 or 50 from a hovering helicopter.

Figure 25:
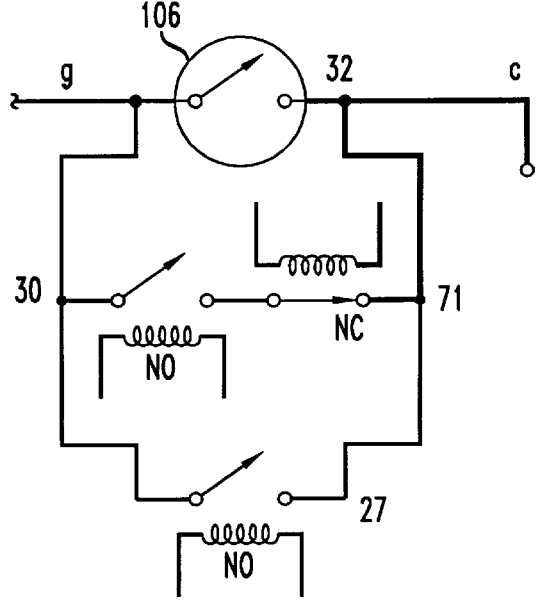
FIG. 25 shows an alternate relay circuit for FIG. 8, in which a two-coil relay is replaced by two relays in series. One relay is normally open while the other is normally closed. One tells operator that hammerheads have abutted. The closing of the other relay circuit causes the motor to bring together the lower portions.

Referring to circuit, FIG. 25, in place of relay 31 with two coils, FIG. 8, relays 30 and 71 have been substituted. Relay 30 is activated by signal provided from strain gauge circuit, FIG. 12; and relay 71 opens the circuit when finger 36, FIG. 4B, makes contact with stopper 38, FIG. 5B, as indicated in FIG. 24. The rest of circuit, FIG. 8, remains the same.

DESCRIPTION OF ANOTHER PREFERRED EMBODIMENT (WITH NO ELECTROMAGNETS AT HAMMERHEADS' LOCATION)

Apparatus 50, shown in FIGS. 6 & 7, would be suspended from a helicopter and designed to scoop up either a person or containerized cargo, as the load to retrieve and transport from one site to another preferred one. The structural design of this apparatus would be similar to the one shown in FIG. 1, but having no electromagnets. Its underneath view would be very much like FIG. 2.

This apparatus includes surveillance camera 19, a dc motor 24, an attached pinion gear 22, a spur gear 23, push button 3' and lamp 34.

If the apparatus is to be placed precisely over load 8, shown in dashed lines, FIG. 6, the helicopter's pilot should know how close apparatus 50 is to load 8. He should be able to estimate the distance from viewing the CRT picture on monitor 46, FIG. 13. The camera 19 could have a zoom lens, so one could change the apparent distance of the object being viewed, bringing the object closer on screen of CRT 46, if desired. It may take the experience of repeated operations, perhaps on a flight simulator, to be a good judge of when to actuate the separation of lower portions 3 and 4, for apparatus to straddle load 8, for its being scooped up, although this operation can be performed automatically, by the IDEC distance sensor, FIGS. 15 and 15A.

To cause lower portions 3 and 4 to separate, the pilot could close switch 32 manually, being aware that also closing DPDT switch 25 in the direction of "d", makes motor 24 rotate gears 22 and 23, FIG. 6, to perform a separation of lower portions 3 and 4. To perform the separation of lower portions 3 and 4 automatically, assuming initially that switch 32 is open and also both relays 27 and 31 are open with DPDT switch 25 in position "d", use IDEC distance sensor 58. Now switch 43, FIG. 15, would be in the closed position, as shown. Relay 27, FIG. 8, turns "on" when detected object is within the near and far limits of sensor 58, that is, within assumed 4 inches and 40 inches of the surface or object below. Within these limits, separation of lower portions 3 and 4 is performed and maintained. At all other distances switch 27 FIG. 8, is in its normally open (No) position.

Then the separation or closure of lower portions 3 and 4 could be performed by strain gauges 21, FIGS. 2, 10 and 12. When fingers 11 and 11' touch the surface below and bend, the change in resistance of the strain gauges cause an unbalance in the wheat-stone bridge of FIG. 12; the unbalance produces a voltage output, because of the applied voltage from voltage source 42; this voltage is amplified by amplifier 41; output of 41 is then applied to relay 31, closing the circuit. When DPDT switch 25 is in "d" position, lower portions 3 and 4 are separating or kept separated. When switch 25 is in position "c", lower portions 3 and 4 close, by motor 24 rotating in the lower portions' closing direction. In closing, fingers 11 and 11' could still be bending and strain gauges sending a signal to relay 31 to keep closing. To assist fingers' 11 ability to scoop underneath load 8, apparatus 50 could be lifted very slightly, so fingers 11 would not bend as much but still be able to get underneath load 8. Teflon ribs 33, under fingers 11, FIG. 17A, and thin sleeves 64, at end of fingers, assist in helping fingers get underneath load 8. For slightly heavier loads, fingers are double in width, as shown in FIG. 19A, having wider fingers 65 and wider sleeves 66 at ends of fingers 65. Sleeves 64, 66, and 69 also protect finger ends from wear and damage.

When lower portions come together lamp 34 illuminates because push button 35, FIG. 6 and 11, is depressed by upper portion 4'. The illuminated light bulb tells the pilot to open the motor circuit. He could do so by opening DPDT switch 25. Once fingers 11 are completely under load 8, they no longer would bend for a light load and their strain gauges would no longer provide an output signal. Consequently, relay 31 would be in its normally open (No) position. In case relay 31 is still in its closed position, when apparatus is being hoisted up, DPDT switch 25 would be opened to be sure that motor 24 is open-circuited. Due to the weight of apparatus 50 and its load 8, hoist cables 13 and 14 keep lower portions 3 and 4 in their closed position.

In FIG. 7, tapered pin or screw 10' fastens hub of lower portion 4 to pivot pin 10, to enable the two, lower portion and pivot pin, to move together when spur gear 23 is rotated by pinion gear 22. Accidentally jarring apparatus 50 would not separate lower portions 3 and 4, because of pinion gear 22 meshing with spur gear 23.

If the stop surfaces of fingers 11 and 11', or wider fingers 65 and 65', are greased and load 8 placed on a riser, scooping up load 8 would be easier.

The procedure for retrieving a load using apparatus 5 of FIG. 6, and FIG. 2, would be the following:

To scoop up a load, either containerized cargo or a person, apparatus 50 is lowered via hoist cables 13 and 14, using a winch in the aircraft. When ultrasonic distance sensor IDEC SA6A-LK4S, FIG. 15, senses the presence of a platform or the ground below, at a height of about 40 inches, the sensor's output is applied to relay 27, causing the relay to close and motor 24, FIGS. 8 and 9, to rotate, separating lower portions. Lower portions 2 and 3 continue separating until sensor 58 is 4 inches above ground; then relay 27 circuit opens, stopping the rotation of motor's shaft. Then apparatus 50 is allowed to slowly descend the final 4 inches by the operator in the aircraft while simultaneously reversing DPDT switch 25, FIG. 8. When fingers 11, 11' with strain gauges 21 sense bending of the fingers, the voltage output from amplified 41, FIG. 12, causes relay 31 to close by starting and operating motor 24 which brings lower portions 3 and 4 together. In closing, fingers 11, 11', get underneath a relatively light load, such as a person, and the lower portions keep closing until hammerheads 1' and 2', FIG. 1, make contact. When hammerheads make contact so does extension 36 with stopper 38, FIG. 4B and 5B, opening relay 31, FIG. 10A.

Push button switch 35 is opened, when lower portions start closing, FIG. 11. It should be mentioned and added that relay 31 has 2 coils; one coil closes the relay's contacts, the other coil opens the contacts of relay 31. In FIG. 10, when extension 36 makes contact with stopper 38, relay circuit is opened, thus stopping motor 24 shaf'ts rotation, FIGS. 8 and 9. Now fingers 11 and 11' are under load 8 and apparatus 50 is ready to be hoisted up to the hovering aircraft. Pilot of aircraft is signaled via illuminated light bulb 72, FIG. 24, that apparatus of is ready to be hoisted up. Anyone on the ground also could so signal the helicopter pilot. As long as light bulb 72 is illuminated, lower portions 3 and 4 are snugly closed around load 8. Pilot or operator keeps hoisting apparatus up until it reaches the aircraft. Upon reaching the opening underneath the fuselage and safely on a platform the load can be removed by manually toggling DPDT switch 25 and thereby reversing the direction of rotation of motor 24. Voltage is applied to motor 24 by manually closing toggle switch 32, FIG. 8, thereby allowing lower portion 3, 4, to separate. When lower portions separate sufficiently to remove load 8, switch 38 is manually opened. A relatively light load 8 is assumed.

Another way to remove load 8 with out separating lower portions 3, 4, is to deflate inflated pillows 16 by letting out air at valves 18. Then when apparatus 50 is ready for reuse, pillows 16 are re-inflated to the desired pressure for snugly holding in position a known load to be scooped up from platform below. When space is limited in the fuselage for separating lower portions, then the latter approach for removing load 8 is preferred.

In FIG. 2, rounded raised ribs 33, of Teflon material, are shown to enable fingers 11, 11' to slip under the load more easily. Fingers also could be profusely greased to enable then to slip under load 8 more easily.

Another manufacturer of distance sens ors is Dolan-Jenner Industries, 678 Andover St., Lawrence, Mass. 01843. Dolan's sensors, sense small targets from 0.2 to 2 meters. The sensor is not affected by background changes, such as color, shape or surface material. Models use long-lasting, infrared LEDs. Response time is 2 msec light-on, 5 msec dark-on or 20 msec relay output.

Coil A of relay 31, FIG. 8, is energized to close by strain gages on fingers 11, 11', FIG. 2. When 31 closes, motor 24 rotates in the proper direction because of DPDT switch 25's position to bring lower portions 3 and 4 together. When they come together, two actions occur. Push button 35, FIG. 11, closes light bulb 34' circuit to inform pilot; and finger 36, FIGS. 4B and 6, makes contact with stopper 38, FIGS. 5B, 3 and 6, to energize coil B to open, thereby opening motor 24 circuit. Then apparatus 50 is ready to be hoisted. In case a-relay with two such coils as described above, is unavailable, an alternate circuit is shown in FIG. 25. In this circuit, two relays in series 30 and 71 are provided to replace relay 31. Relay 30 has coil A' (NO), while relay 71 has coil B'(NC). Switch 32 is manually operated, as a back-up, with which to stop motor 24, in case any of the three relays 27, 30 or 71 become inoperative; then all or some of the relay operations could be performed manually, if so desired.

Referring to FIG. 25, relay 30 is closed when fingers 11, 11' bend, producing a change in strain-gauge 21 resistance, thus energizing motor 24 to operate and close lower portions 3 and 4, while relay 71 is opened when horizontal finger 36, FIG. 6, makes contact with stopper 38, FIG. 6, to de-energize and stop motor 24.

To Review How Apparatus 50 and its Controls Work to Scoop Up Loads

When Apparatus 50 is lowered within 40 inches of Cargo 8, relay 27 is closed by distance sensor 58, FIG. 15, and power is applied to motor 24, with DPDT switch 25 in the desired position, to separate lower portions via gears 22 and 23.

When bottom of apparatus is within about 4 inches of ground 48, relay 27, FIGS. 8 and 15, opens motor circuit. Now DPDT switch, FIG. 8, is manually toggled to reverse voltage polarity, by the aircraft pilot or his assistant.

If fingers 11 at apparatus' bottom bend from making contact with ground 48, a signal is generated by the change in resistance of strain gauges 21. The amplified voltage Vo causes relay 30, FIG. 25, to close and motor 24 to rotate, thereby closing lower portions 3 and 4. When fingers 11, 11', no longer bend as they come together, strain gauge signals are appreciably reduced. Then, dc motor 24 stops rotating. If dc signal is not sufficiently reduced to stop motor 24, a backup circuit consisting of stopper 38 and finger 36, FIGS. 4A to 5B, 6 and 10A, opens motor circuit, when 38 and 36 make contact, as shown in FIG. 10A or FIG. 25, for two different type relays, 31 and 71. The circuit of FIG. 24 closes when hammerheads 1' and 2', FIG. 6, abut.

Light bulbs 72 (FIG. 24) and 34 (FIG. 11) provide different color lights, to help the pilot to distinguish from the two different control actions. FIG. 11's action denotes maximum separation of lower portions 3 and 4, while FIG. 24's action denotes maximum closure of lower portions 3 and 4.

ANOTHER PREFERRED EMBODIMENT

Figure 36:
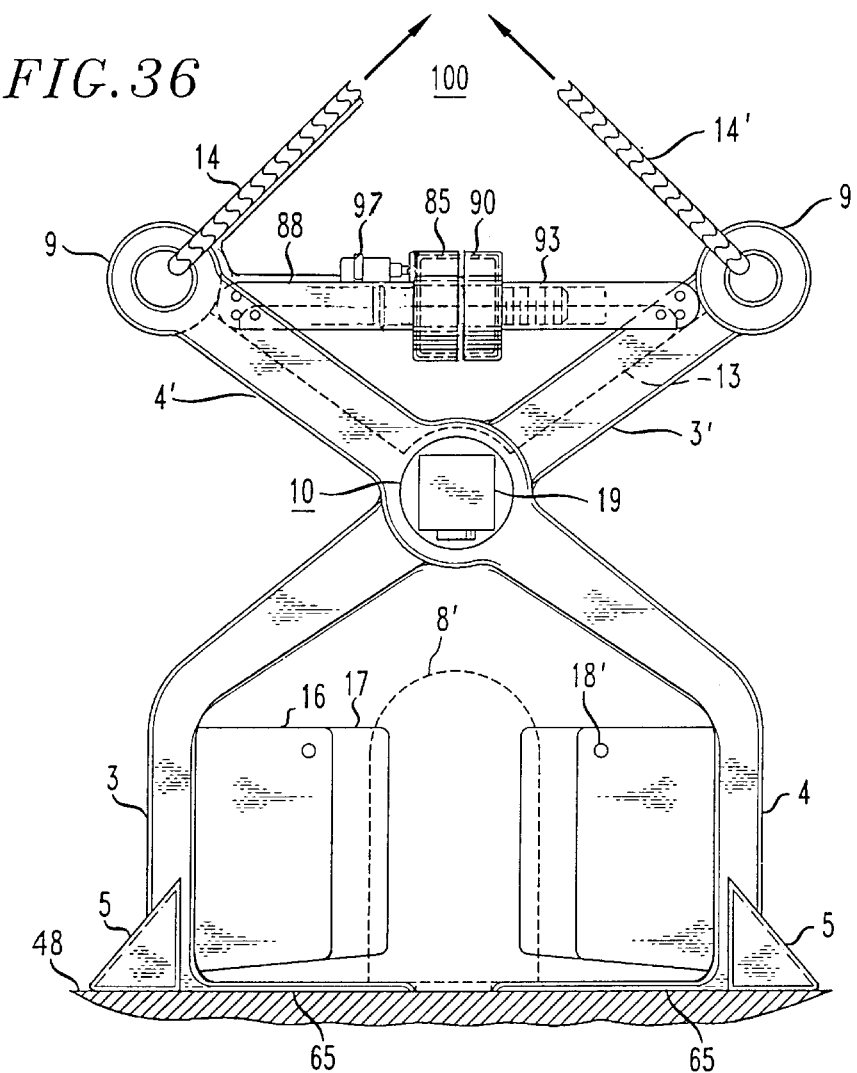
FIG. 36 shows a front assembly view of the apparatus, including the magnet assemblies, FIGS. 32 and 33.

To retrieve objects from the ocean, the embodiment shown in assembly drawing, FIG. 36, is presented. First, referring to apparatus 20, FIG. I, hammerheads 1' and 2' are replaced by bi-polar magnet assemblies 85 and 90, FIGS. 32 and 33, manufactured by Bunting Magnetics Co., Morristown, N.J. Then in bottom view, FIG. 2, finger-like extensions 11 and 11' are replaced by extensions 65, shown in FIGS. 19A and 19B, as being able to lift heavier weights. Ribs 33 also help provide strength to the extensions.

Figure 32:
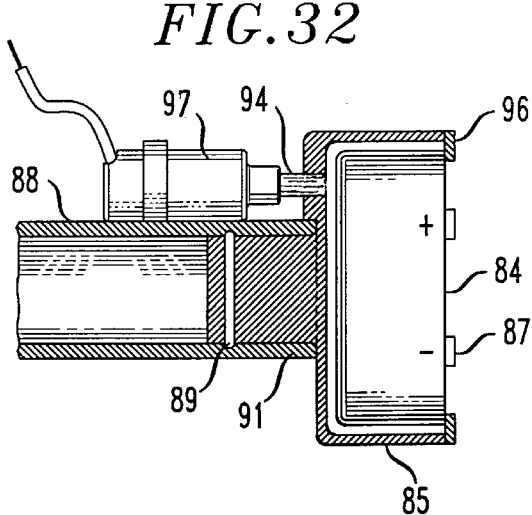
FIG. 32 shows a side view cross section of the magnet assembly of FIG. 30 taken along line 32—32, and includes a hollow horizontal support bar for the magnet assembly and a dc solenoid with a plunger to allow the magnet assembly to rotate when the plunger is retracted from a hole in back of the magent assembly.
Figure 33:
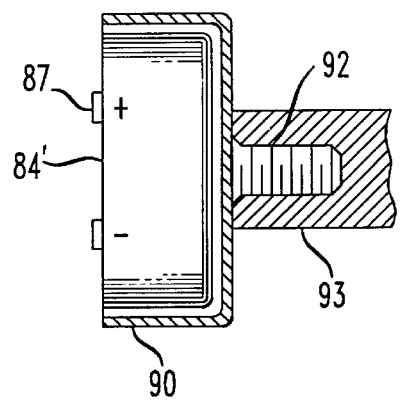
FIG. 33 shows the opposing magnet assembly, one which remains stationary, supported by a horizontal bar. It, too, is a side view cross section of the assembly shown in FIG. 31, taken along line 33—33.

Because apparatus 100 may be immersed in salt water for short periods of time, all parts of the apparatus should be waterproof, including solenoid 97, magnet assemblies 85 and 90 and camera 19). For non-water application, waterproofing would be unnecessary. Five-resistant parts also would be desirable. In FIG. 33, magnet assembly 90 is stationary, being fastened to bar 93 by threaded. stud 93' screwing into it. Magnet assembly 85 is rotatable about bar 88, FIG. 32. Both assemblies are bipolar, having magnets of both (+) and (−) polarities. In FIG. 36, numeral 95 has its lead line pointing to strap, holding solenoid 97 in place.

The objective for the magnets is to produce propulsion when apparatus 100 is being lowered by the hoist cable, and for the magnet assemblies to provide attraction for each other when the apparatus is being hoisted upward. To accomplish the above result, each assembly, 85 and 90, has a magnet of each of two polarities as shown in FIGS. 30 to 33. The assemblies, 85 and 90, repel each other when like polarities face each other as shown in FIGS. 32 and 33. When assembly 85, FIG. 32, rotates 180° automatically, the assemblies, 85 and 90, attract each other, as a result of solenoid plunger 94 retracting.

Initially, the assemblies are in the position of repulsion. This is accomplished by placing a round hole in the rear of assembly 85, as shown in FIG. 32; then have the plunger of solenoid 97, normally extended, inserted in the round hole, as shown in FIG. 32. When energy is applied to solenoid 97 by closing a voltage supply switch, plunger 94 retracts, allowing assembly 85 to rotate automatically 180° to the position for magnet assemblies, 85 and 90, to attract each other. This would automatically happen since up to this time, the assemblies have been close enough to repel each other, caused by the initial upward motion of the hoist cable, making upper portions, 3' and 4', of apparatus to come together. As soon as plunger 94 retracts, assembly 85 wants to rotate because it wants to attract the opposing magnet assembly. This 180° rotation takes only a second to occur. Hence, after a few seconds, the toggle switch located in the cock pit can be opened. There would be no good reason to use up electrical power to keep the plunger retracted, and possibly overheat the solenoid. The wall 85 of casing of assembly, FIG. 32, is thickened in the location of the hole, to allow plunger 94 to extend sufficiently into the wall. Plunger's diameter may be 7/16 inch, sturdy enough to avoid being bent by the magnetic-force of rotation, existing during the repulsion stage of the cargo retrieval process. This is an inexpensive, simple way to accomplish the separation of upper and lower portions of apparatus 100. Then positive-load-retention is produced by the magnets attracting and abutting each other when apparatus 100 is being hoisted, with plunger 94 retracted.

It should be mentioned that plunger 94 and the hole could be well greased and perhaps oiled to allow the plunger to move freely when either extending into the hole or retracting from it.

To keep magnet assembly 85 from coming off bar 88, split ring 89 is provided. A circular groove is provided for seating ring 89 both on hub 91 and interior of bar 88, as shown in FIG. 32. What is shown in FIGS. 30 to 33 are off-the-shelf bipolar magnets, available from Bunting Magnetics Co., P.O. Box 739M, Morristown, N.J. Solenoid 97 also is an off-the-shelf device, available from Lucas Control Systems Products, 802 Scholz Drive, P.O. Box 427, Vandalia, Ohio. FIG. 32 is a section, taken along line 32—32 of FIG. 30, while FIG. 33 is a sectional view taken along line 33—33, FIG. 31. Tabs 96, fastened to casing 85, FIGS. 30 and 32 prevent magnet assembly 84 from coming off of casing 85, FIG. 32. Casing or sleeve 85 is free to rotate about bar 88, FIG. 32, which could be either circular or rectangular in cross-section.

Figure 34:
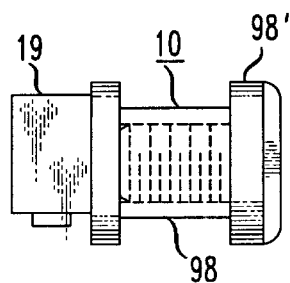
FIG. 34 shows a side view of the pivot pin shown in assembly, front view of apparatus, FIG. 36, as well as in FIG. 1. A side view of camera also is shown.
Figure 35:
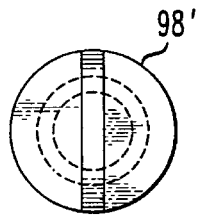
FIG. 35 shows an end view of the pivot pin, including the nut.

To explain the operation of Apparatus 100, while it is being lowered from the helicopter by a hoist cable, magnet assemblies 85 and 90, FIG. 36 are kept apart by the repulsive force of like polarities facing each other. Consequently, approaching load 8', in its downward movement, the apparatus' upper and lower portions, 3 and 4, are already separated so when contact is made with an object below, they continue to separate until maximum separation is realized by virtue of hoist cables 14 and 14' becoming slack. The weights on top at 9, FIG. 36, produce horizontal components of force which urge the above portions to separate until they reach their limit of separation. Whether apparatus 100 is snatching a container on land or snatching one in the ocean, the separation will occur because of the weights on top. Once extensions 65, FIGS. 19A and 19B, have reached underneath container 8', FIG. 36, revealed by Camera 19 magnetic assembly 85 is allowed to rotate 180° by energizing solenoid 95 momentarily. Now assemblies 85 and 90, attract each other, because of unlike polarities facing each other and the tension on said cables, as upward movement is applied to hoist cables 14 and 14'. When the opposing magnet assemblies abut, they remain so; simultaneously lower portions 3 and 4 have come together, and they remain in a closed position under all environmental conditions, until manually separated. When apparatus 100 (FIG. 36), is lifted aboard the helicopter, magnetic assemblies 85 and 90 may be separated forcibly by human hands, in order to remove load 8' from apparatus 100. An alternate way is to remove pin 10 partially by removing nut 98, FIG. 34 and 35. Then magnet assembly 90 can be easily slid away from magnet assembly 85, FIG. 36, so load 8' can be removed from apparatus. Since apparatus may no longer be needed for retrieving additional cargo, the two halves of apparatus 100 may may be completely separated, dried and carefully placed in storage, assuming the retrieval has been from the ocean.

Using off-the-shelf Bunting Magnetics bipolar part No. BM1914 x ½, which is 1¼ inches in diameter, one would have a slightly different structural design for hammerheads 85 and 90 for an apparatus in which its height, standing upright, is approximately 60 inches, as shown in FIG. 36. Magnetic assembly 84 FIG. 37 would be inserted into bar 88' since the bar can be assumed to be 1¾" by 1 ¾". Now solenoid would be located inside bar 88' instead of being on the bar's exterior. In its new position, the solenoid would be protected from water, sun's rays, and snow. Sleeve 102 would help, take the horizontal stresses, when the hammerheads abut when lower portions 3 and 4, FIG. 36, come together. The magnetic assemblies can only withstand a total horizontal impact force of 250 lbs. Sleeve 102 should take on the brunt of the horizontal force, produced by the weight of cargo 8'.

Figure 37:
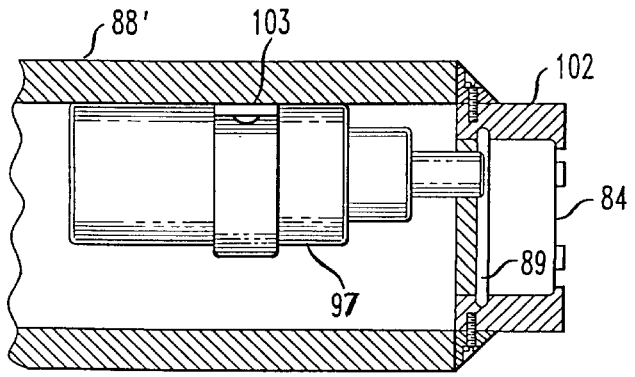
FIG. 37 shows a side cross section of the horizontal bar taken along line 37—37 of FIG. 38, Here the solenoid is located inside of the hollow bar, enabling the solenoid to be protected from the weather.
Figure 38:
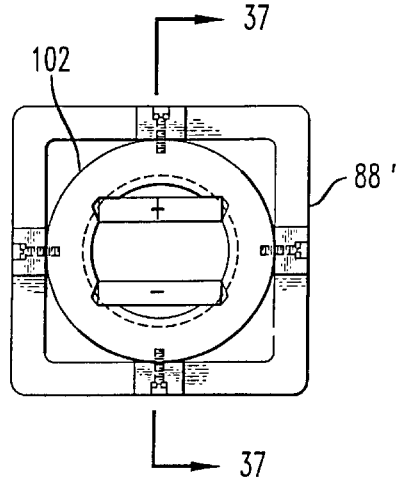
FIG. 38 shows an end view of the magnet and bar assembly of FIG. 37.

Hammerhead 90 also would have magnet assembly 84' inserted in bar 93 and would be held in place by a sleeve identical to 102, FIG. 37, as shown in FIG. 38. An aluminum disk would be welded to the back of magnet assembly 84 or it could be fastened to it by screws and appropriate adhesive so a hole can be provided in back of assembly 85 for plunger 94 of solenoid 97.

For scooping up heavier than 250 lb. loads, two magnet assemblies would be used side by side, to obtain twice the magnetic attraction of abutting hammerheads, while also being able to sustain twice the impact pressure from lifting heavier loads. It is desirable for the pilot to know when the upper portions of apparatus 20 have come together, with hammerheads 1' and 2' abutting. To provide this indication, a lamp is illuminated when that happens. Now the pilot is alerted that apparatus 20 may be hoisted up to the helicopter. The implementation of this technique is shown in FIG. 40, Sheet 2. FIG. 40 shows a combination line and circuit diagram of the technique. In the circuit are shown battery 26, light bulk 34', finger 36 and stopper 38. Also in the circuit, as lines, are bar 2, upper portions 3', 4', and pivot pin 10, all of which would be metal, capable of conducting electricity. Wheel hammerheads 1', 2' come together, so do finger 36 and stopper 38. In so doing, light bulb 34' is turned "on" because the circuit has been closed. The illuminated light bulb gives the signal to the pilot to hoist up load 8. When load 8 is removed from apparatus 2 and lower portions 3 and 4 separate, circuit of FIG. 40 is opened and bulb 34' turns off. Also, manual switch 106 is available for turning off bulb 34' under other situations. Battery 26 could be located inside of bar 1, as in FIG. 39, Sheet 8, or the voltage could be supplied from a source in the aircraft via insulated wires running along the hoist cable. Then manual switch 106 would be located in the aircraft's cockpit, and is not shown in the drawings except in FIG. 40.

FIG. 36A shows apparatus 100 with solenoid plunger 94 extended with like magnet polarities facing each other initially so that hammerheads 85 and 90 repel, thus keeping hammerheads apart. Hence, lower portions 3 and 4 also separate so load 8' can be grabbed by extensions 31 and 11'. Camera 19 enables pilot or his assistant; to view the positioning of apparatus 100 before closing switch to energize solenoid 95 to cause plunger 94 to retract and allow hammerheads to rotate 180°. When switch is closed magnet assembly 84 automatically rotates 180° to have unlike magnet polarities to (ace each other. The attracted magnets nets in hammerheads come together, as well as apparatus' lower portions' extensions 11 and 11'. Thus, lower extensions grab underneath load 8 and inflated pillows 16 embrace the load. Thus the load is ready to be transferred to a desired location by the hovering helicopter. The attracted magnets in the hammerheads provide positive secure load retention. The load could be hoisted to the helicopter's baggage compartment or cockpit area or passenger area before the helicopter pilot moves the aircraft.

I claim:

1. An automatically-actuated, remotely-controlled load-scooping and lifting apparatus, adapted for being suspended from a helicopter, said apparatus being capable of selectively scooping up a load from terrain, then selectively unloading said load, said apparatus comprising a structure having two elongated lightweight members, each elongated lightweight member including a lower portion and an upper portion, each of said elongated lightweight members further including an inside surface to which inflated pillows are attached, said elongated lightweight members being pivotally connected at a selected distance from their top ends by and with a pivot pin, said pivot pin including a hub portion, said upper portions being arrayed for attachment to hoist cables, each of said upper portions including weights thereon, said upper portions being narrower than said lower portions, each lower portion being contoured along said inside surface for engaging a load, each of said upper portions having a bar inwardly extending therefrom, each bar having a hammerhead at one of its ends, and each of said hammerheads being arrayed for facing each other, said hammerheads, when in an abutting condition, receiving the major structural compressive stresses imposed by any horizontal force components being applied by said hoist cables, when supporting said load, thereby minimizing damaging compressive forces to said load, said lower portions further including extending protrusions with selectively rounded dull ends, each protrusion extending a selected distance toward the apparatus' horizontal center, wherein said extended protrusions having a plurality of load-supporting fingers, each of said flexible fingers having a selected cross-section for extending fingers underneath said cargo, as and when said lower portions are brought to a closed condition prior to lifting said load; and upper and lower surfaces of said fingers being coated for minimizing friction when contacting said load; and each of said fingers having at least one rib along its length, fastened firmly to its underneath, to provide stiffness to said fingers.

2. An automatically-actuated, remotely controlled lifting apparatus, in accordance with claim 1, wherein the improvement to said lower portions further includes at least one ultrasonic distance sensor emitting a sensor signal reflecting from the surface below for providing a sensory indication to a pilot of said helicopter that said lower portions of said apparatus is at a predetermined distance above the surface below.

3. An automatically-actuated apparatus in accordance with claim 1, wherein the pivot pin includes an attached miniature surveillance camera positioned thereon for providing an image of the terrain below thereby to assist the pilot of said helicopter in locating said load, an electrical cord from the helicopter's power supply extending to said apparatus to provide the needed voltage supply for said camera and signals from said camera to a viewing screen mounted in the view of the pilot.

4. An automatically-actuated apparatus in accordance with claim 1, wherein the improvement includes a plurality of strain gages each adhesively attached to at least one recess on a selected surface of said fingers, said strain gages being located at a position for sensing the greatest change in said gages' resistance, each of said gages being electrically connected in one leg of a wheatstone bridge, each being connected in parallel in the same leg of the said wheatstone bridge, thereby producing the greatest amount of unbalance to said bridge thus creating the greatest output voltage to activate a mechanical relay, said relay selectively controlling activation of an electric motor, thereby affecting the separating or closing of said lower portions by starting, reversing or stopping the motor.

5. A remotely-actuated weight-lifting apparatus in accordance with claim 1, wherein the improvement to said apparatus includes having a large spur gear centrally, axially, and rigidly fastened to said pivot pin by a hub portion, a reversible direct current motor, with a pinion gear, mounted thereon being fastened to one of said lower portions' exterior surfaces and said pinion gear meshing with said spur gear, a hub member of cone said elongated lightweight members being fastened to said pivot pin, so that one elongated lightweight member will rotate with respect to the other, one of the elongated lightweight members being fixed to the pin, and said motor with pinion gear attached to the other elongated light-weight member, said motor being selectively operated from a direct current power source in combination with a double-pole, double-throw switch, said switch being located in said helicopter cockpit, said motor and meshing spur and pinion gears enabling said lower portions to separate in order to straddle said cargo load when said motor rotates in one direction; and said lower portions moving toward each other to scoop up said load, as and when said motor rotates in a second direction, opposite to the one direction.

6. A remotely-actuated, lifting apparatus in accordance with claim 5, wherein said motor having a shaft and wherein said pinion gear being attached to said motor's shaft by a friction clutch, capable of slipping when said spur gear no longer is able to rotate, as a result of said lower portions of said apparatus having reached their maximum separation-distance thereby minimizing damage to said motor.

7. An automatically-actuated, remotely-controlled weight-lifting apparatus in accordance with claim 1, wherein the improvement to said apparatus includes having a supplementary stabilization means, said stabilization means being attached at the exterior lower end of each lower portion, said stabilization means being a light-weight plastic, selectively-shaped form attached at a selected position, said position being for most effectively stabilizing said lower portions in an upright position on a platform.

8. A remotely-actuated, weight-lifting apparatus in accordance with claim 1, which further includes insulated coiled wires carried on each of said bars said bars to form electromagnets capable of repelling each other; each electromagnet being wired in series; at least one double-throw switch for closing an electrical circuit, and a power supply; and wherein the improvement to said upper portions include a closed magnetic loop to occur in said upper portions of said apparatus when said hammerheads are abutting; each of said upper portions having a soft steel bar, a soft steel hammerhead and said upper portions themselves being soft steel, so a repelling force between said hammerheads can occur when their electromagnetic polarities are alike, said double-throw switch being selectively toggled to close said circuit, causing the separation of both said hammerheads and said lower portions; said switch being selectively toggled to open said circuit when closure of said hammerheads is desired.

9. An automatically-actuated apparatus, in accordance with claim 1, wherein said fingers have resilient slippery sleeves covering said ends to better able to slip underneath said load and to provide protection against possible injury for person being rescued.

10. An automatically-actuated apparatus in accordance with claim 1, wherein said fingers extending from said protrusions of each of said lower portions being capable of meshing, like the teeth of meshing spur gears, thereby forming a more complete and secure support for a scooped-up load, as said apparatus is being lifted to said helicopter, providing openings for any scooped up water to pass through.

11. An automatically-actuated apparatus in accordance with claim 1, wherein a selected number of said fingers are capable of extending further after said lower portions have come together by means of finger extenders, said extenders including springs in a hollow enclosure; and a solenoid providing the remote control extending actuation.

12. An automatically-actuated apparatus in accordance with claim 1, wherein each of said hammerheads including a bipolar permanent magnet assembly in a casing, each permanent magnet assembly having both positive and negative polarity magnets imbedded therein; one said assembly being rotatable and the second being fixed to its bar; in a first position of said rotatable assembly , the two assemblies repel each other; in a second position, 180° rotated position from the first, the two assemblies attract.

13. An automatically-actuated apparatus in accordance with claim 12, which further includes a pull-type tubular solenoid, with a plunger, mounted on one said bar, with said plunger, normally-extended, facing the rear of said first assembly; said first assembly having a hole in said casing for said plunger to extend into to provide a repulsive force, between the said first and said second assembly, said plunger being extended into said hole; in order to provide an attraction between said first and said second assembly, electrical energy being applied to said solenoid, via a switch, thus retracting said plunger from said hole, for allowing said first assembly to automatically rotate approximately 180°, thus having unlike polarities of magnets facing and attracting each other to provide positive-secure-load-retention for said apparatus load while being lifted.

14. An automatically actuated apparatus in accordance with claim 1, wherein said upper portions form a metallic conductive path when said hammerheads abut, and wherein a means for indicating closure of said lower portions is provided to enable the pilot of said helicopter to be aware of said closure, said means for indicating closure to include a light bulb, a voltage source and movable electrical contacts, all three connected in series, and using said upper metal portions to complete an electrical conductive path when said movable contacts come together and make contact, when said hammerheads of said upper portions also abutting.

* * * * *